United States Patent [19]

Igashira et al.

[11] 4,359,974

[45] Nov. 23, 1982

[54] INTAKE MANIFOLD FOR MULTICYLINDER INTERNAL COMBUSTION ENGINE

[75] Inventors: Toshihiko Igashira, Toyokawa; Hitoshi Yoshida; Ken Nomura, both of Okazaki; Seiko Abe, Kariya, all of Japan

[73] Assignee: Nippon Soken, Inc., Nishio, Japan

[21] Appl. No.: 173,354

[22] Filed: Jul. 29, 1980

[30] Foreign Application Priority Data

Sep. 3, 1979 [JP] Japan .......................... 54-122018[U]

[51] Int. Cl.³ ...................... F02M 29/04; F02M 31/12
[52] U.S. Cl. .................................. 123/52 M; 123/549; 123/590
[58] Field of Search .............. 123/52 M, 590, 547–549

[56] References Cited

U.S. PATENT DOCUMENTS

| | | | |
|---|---|---|---|
| 3,827,416 | 8/1974 | Ader et al. | 123/590 |
| 3,987,772 | 10/1976 | McBride | 123/549 |
| 4,019,483 | 4/1977 | Konomi et al. | 123/590 |
| 4,088,104 | 5/1978 | Ibbott | 123/590 |
| 4,242,999 | 1/1981 | Hoser | 123/549 |
| 4,327,698 | 5/1982 | Hamai et al. | 123/508 |

FOREIGN PATENT DOCUMENTS 2384119 3/1977 France ............................... 123/590

*Primary Examiner*—Craig R. Feinberg
*Attorney, Agent, or Firm*—Cushman, Darby & Cushman

[57] ABSTRACT

An intake manifold for a multicylinder internal combustion engine having fuel supplying means such as a fuel injection device or a carburetor includes a branch intake conduits each communicating with one of the cylinders of the engine, an extension tube connected to a primary suction conduit of the carburetor, and an incoming fuel charge heating device mounted on the bottom of the intake manifold. The extension tube has a curved portion in its wall directed toward a part of the surface of the bottom of the intake manifold at which the axial center lines of the branch intake conduits gather together and cut to form an open end of the extension tube. The incoming fuel charge heating device has a heating surface disposed near the open end of the extension tube, which is smoothly curved toward the bottom of the intake manifold. The open end of the extension tube is disposed on a plane forming an acute angle with the wall of the tube at the outermost edge of the open end and contiguous at the innermost edge thereof with a straight portion of the wall of the tube, as viewed in cross section. The incoming fuel charge heating device may include positive-temperature-coefficient thermistors.

2 Claims, 9 Drawing Figures

INTAKE MANIFOLD FOR MULTICYLINDER INTERNAL COMBUSTION ENGINE

BACKGROUND OF THE INVENTION

This invention relates to improvements in or relating to an intake manifold for a multicylinder internal combustion engine capable of optimizing vaporization and distribution of an incoming fuel charge.

In a multicylinder internal combustion engine of the spark ignition type using a fuel injection device or a carburetor, fuel supplied to a suction conduit of the carburetor or a primary suction conduit, for example, is distributed at a riser portion of the intake manifold to flow in streams to branch intake conduits each connected to one of the cylinders. In the event of fuel distribution not being effected equally, fuel-air mixtures introduced into some cylinders will become too enriched while those introduced into the rest of them will become too lean, so that smooth operation of the engine will be interfered with. To effect equal distribution of the fuel requires thorough vaporization of the fuel before introduction into the branch intake conduits. As a means for attaining this end, an extension tube is known which is mounted in the intake manifold and is connected to the suction conduit of the carburetor in such a manner as to open at its end into air streams. Also known in the art is to heat riser the riser portion of the intake manifold by the cooling fluid of the engine. However, the use of the cooling fluid of the internal combustion engine for heating the riser portion of the intake manifold is unable to achieve satisfactory results due to the fact that the temperature of the engine cooling fluid takes time to rise following engines startup. To eliminate this disadvantage, proposals have been made to use a quick heating type of device including a ceramic heater having positive-temperature-coefficient (hereinafter PTC) thermistors.

The extension tube referred to hereinabove is still in the experimental stage and not put to practical use yet. Thus no extension tubes of easy fabrication and ready mounting are known which lend themselves to mass production. One of the problems yet to be solved with regard to extension tubes of the prior art is that although the use of an extension tube contributes to obtaining equal distribution of the fuel, the resistance offered by the extension tube to the flow of fuel-air mixtures causes a reduction in suction efficiency. Also, the use in the intake manifold riser of a quick heating type device including a ceramic heater having PTC thermistors is itself very effective in obtaining vaporization of the fuel. However, there has been no report in the literature on the synergistic effect of the use of this type of heater in optimum combination with an extension tube.

As viewed in a bottom plan view, an intake manifold for a multicylinder internal combustion engine has a construction wherein extensions of the center lines of its branch intake conduits are concentrated in a small part of the riser portion. Thus it is a conclusive factor concerned in obtaining improvements in the distribution of the fuel that the fuel be concentrated in this part and quickly and thoroughly vaporized therein.

SUMMARY OF THE INVENTION

This invention has as its object the provision of an intake manifold for a multicylinder internal combustion engine which is capable of achieving a synergistic effect by the use of an extension tube and a quick heating type heat device including a ceramic heater having PTC thermistors.

The aforesaid object can be accomplished in the present invention by arranging an extension tube in such a manner that the fuel from the carburetor can be concentrated in a part of the intake manifold in which the center lines of the branch intake conduits converge while the heating surface of incoming fuel charge heating means is located in such part of the intake manifold. The extension tube has a wall including a straight portion and a curved portion contiguous with one another, so that the extension tube can be readily fabricated by means of a press and easily mounted in the intake manifold. The extension tube of the aforesaid construction offers a minimum resistance to the flow of incoming fuel charges.

Additional and other objects, features and advantages of the invention will become apparent from the description set forth hereinafter when considered in conjunction with the accompanying drawings.

DESCRIPTION OF THE PREFERRED EMBODIMENTS

Figure 1:
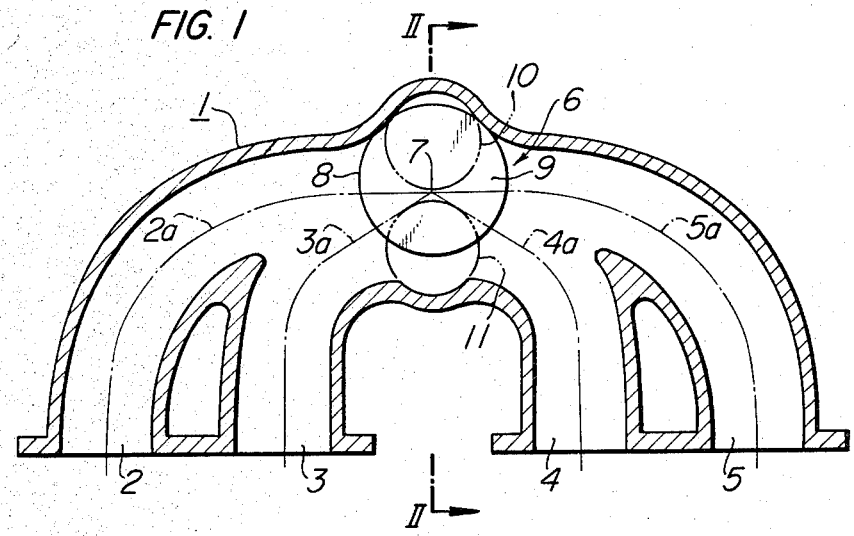
FIG. 1 is a transverse sectional view of the intake manifold comprising a first embodiment of the invention, taken along the line I—I in FIG. 2.

FIG. 1 is a transverse sectional view of the intake manifold comprising a first embodiment. The intake manifold generally designated by the numeral 1 includes branch intake conduits 2, 3, 4 and 5 each connected to one of four cylinders of an internal combustion engine, not shown, and converging at a riser portion 6 disposed in the center of the intake manifold 1. The branch intake conduits 2, 3, 4 and 5 have axial center lines 2a, 3a, 4a and 5a respectively which are concentrated at a point 7 in the riser portion 6. Disposed on the bottom of the intake manifold 1 in a zone including the branch intake conduit center line collecting point 7 is incoming fuel charge heating means 8 including a planar, disk-shaped heating surface 9 exposed to streams of incoming fuel charges. Located over the riser portion 6 is fuel supplying means such as a fuel injection device or a carburetor having a primary suction conduit 10 and a secondary suction conduit 11, shown in phantom lines. The heating surface 9 is set off center toward the primary suction conduit 10 than toward the branch intake conduit center line collecting point 7.

Figure 2:
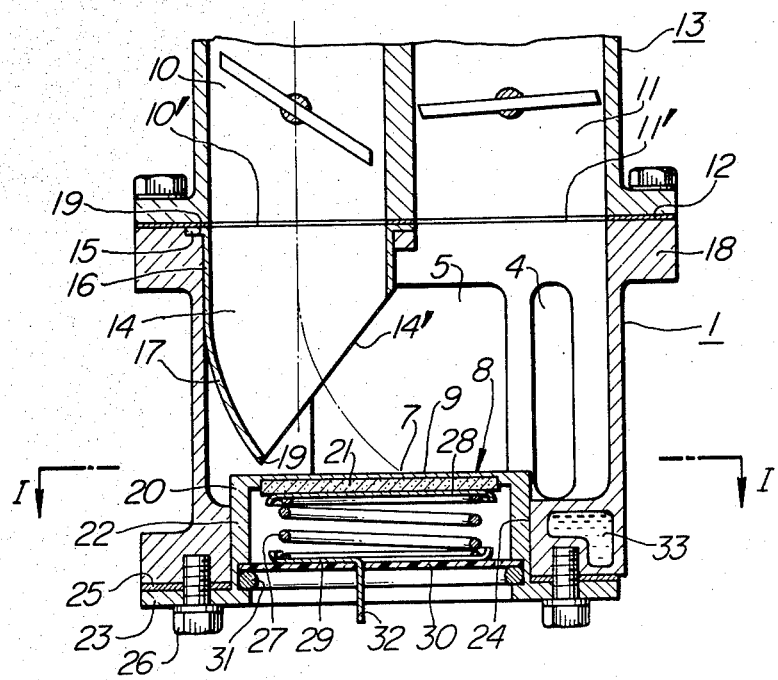
FIG. 2 is a sectional view taken along the line II—II in FIG. 1.

FIG. 2 is a vertical sectional view taken along the line II—II in FIG. 1 which is a transverse sectional view taken along the line I—I in FIG. 2. The carburetor 13 is mounted on the intake manifold 1 through a gasket 12 interposed therebetween. A portion of the intake manifold 1 immediately beneath the carburetor 13 is not essentially divided into the primary and secondary conduits. However, in the intake manifold 1 according to the invention, an extension tube 14 is mounted in the portion of the intake manifold 1 immediately beneath the carburetor 13 and connected to the primary suction conduit 10. The extension tube 14 has in its wall a flange 15, a straight portion 16 and a curved portion 17. The intake manifold 1 is formed at its upper end with a flange 18 for mounting the carburetor 13 thereon. The flange 18 defines openings 10' and 11' corresponding to the primary suction conduit 10 and secondary suction conduits 11 of the carburetor 13 respectively, the openings 10' and 11' leading to a single space in the intake manifold 1. The flange 18 is formed therein by spot facing with a recess 19 forming a larger circle than the opening 10' for snugly receiving the flange 15 of the extension tube 14. The surface of the flange 18 is flush with the surface of the flange 15 fitted in the recess 19, so that the single gasket 12 can provide an airtight seal therebetween. The straight portion 16 of the extension tube 14 is snugly fitted in the opening 10' of the intake manifold 1 and has an outer diameter equal to the diameter of the opening 10' and an inner diameter equal to the diameter of the primary conduit 10 of the carburetor 13. The straight portion 16 of the extension tube 14 extends a substantial distance from the opening 10' into the interior of the intake manifold 1, and the wall of the extension tube 14 is smoothly curved into the curved portion 17 toward the branch intake conduit center line collecting point 7 in the riser portion 6. The extension tube 14 is cut at the curved portion 17 to form an open end 14' disposed in a plane which forms an acute angle and an obtuse angle with the wall of the extension tube 14 at the outermost edge and the innermost edge of the open end 14' respectively, as viewed in cross section. Thus the open end 14' of the extension tube 14 has a larger area than the primary suction conduit 10 of the carburetor 13.

At the innermost edge of the open end 14' of the extension tube 14 in cross section, the wall of the tube 14 is straight and not curved. This allows the extension tube 14 to be inserted from above into the opening 10' defined by the flange 18. The heating surface 9 of the incoming fuel charge heating means 8 is located near a lowermost portion 17' of the extension tube 14 disposed on the outermost edge of the open end 14' of the tube 14 as viewed in cross section. The heating surface 9 should be of a size which includes all the vertical projection of the open end 14' of the extension tube 14.

The incoming fuel charge heating means 8 includes a ceramic heater 21 having PTC thermistors encased in a casing 20 formed of aluminum by die casting and including a cylindrical portion 22, the heating surface 9 covering the upper end of the cylindrical portion 22 and a flange 23 formed at the lower end of the cylindrical portion 22. Formed at the bottom of the riser portion of the intake manifold 1 is an opening 24 of a diameter same as the outer diameter of the cylindrical portion 22 of the casing 20 which has the cylindrical portion 22 of the casing 20 fitted therein. With the cylindrical portion 22 fitted in the opening 24, the heating surface 9 is disposed 3-10 mm above the bottom surface of the intake manifold 1, and the casing 20 is bolted at the flange 23 to the underside of the intake manifold as indicated at 26 through a gasket 25 interposed between the flange 25 and intake manifold 1. The ceramic heater 21 of a thin-disk shape having PTC thermistors whose diameter is slightly smaller than the inner diameter of the cylindrical portion 22 of the casing 20 is located on the undersurface of the heating surface 9 and urged by the biasing force of a spring 27 toward the undersurface of the heating surface 9. The spring 27 has attached to its upper and lower ends spring holders 28 and 29 respectively, the spring holder 29 being supported by a stay 30 formed of resin held in place by a circular clip 31 in a recess formed on the inner periphery of the cylindrical portion 22. The spring holder 29 is formed of copper and has a portion thereof extending downwardly through the stay 30 in the form of a claw 32 which is connected by wire to a positive electrode of a battery. A water jacket 33 occupies other portion of the bottom of the intake manifold 1 than that occupied by the incoming fuel charge heating means 8, to have engine cooling water introduced thereinto.

Operation of the intake manifold 1 of the aforesaid construction will be described. Upon a key switch for starting the internal combustion engine being turned on, a current is passed from the positive electrode of the battery to the claw 32, from which it is passed through the spring holder 29, spring 27, spring holder 28, ceramic heater 21, casing 20 and intake manifold 1 in the indicated order, before being grounded. At this time, a power of high value is consumed by the ceramic heater of PTC thermistors and a large amount of heat is quickly generated and transmitted to the heating surface 9. The PTC thermistors of ceramic heater 21 are resistors formed by sintering and including barium titanate as its principal component. The PTC thermistors have a very low resistance at normal temperature but have their resistance greatly increased when the curie point (120° C., for example) is exceeded. Thus a current of a large value flows to the ceramic heater 21 as soon as the key switch is turned on, allowing the curie point to be exceeded in an instant. As the temperature rises above the curie point, the electric current has its value greatly reduced, so that the temperature is kept from rising above the curie point and the heating surface 9 is kept at about 120° C. or the curie point. The extension tube 14 of the aforesaid construction permits the incoming fuel charge to impinge against the heating surface 9 maintained at about 120° C., allowing almost all the fuel charge to be vaporized by the elevated temperature of the heating surface 9. The position in which vaporization of the incoming fuel charge occurs is, as aforesaid, the point at which the center lines of the branch intake conduits connected to the cylinders gather together, so that equal distribution of the incoming fuel charge to the cylinders can be obtained.

Figure 3:
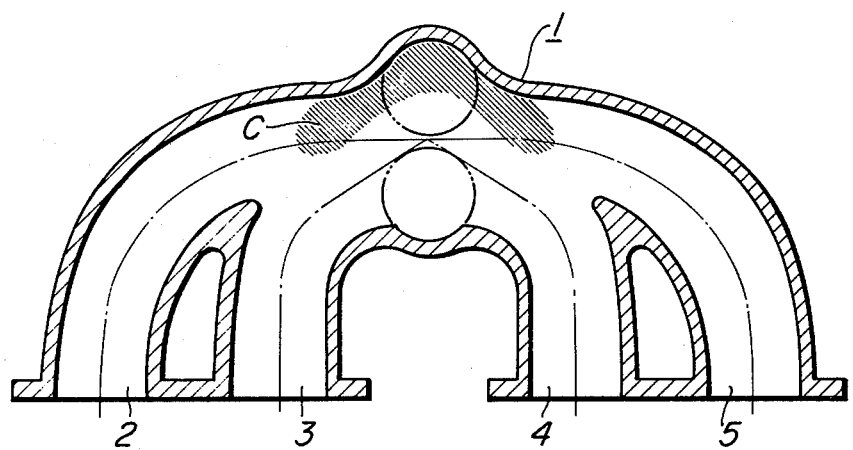
FIGS. 3, 4 and 5 are views in explanation of the results of tests conducted on the distribution of fuel within the intake manifold.

Experiments were conducted on the intake manifold according to the invention. The results of the experiments will be described by referring to FIGS. 3-5. FIG. 3 shows the results of experiments on the fuel distribution on the surface of the bottom of the riser portion 6. In the experiments, the intake manifold had no extension tube and its bottom surface was flat. The results show that the major part of the incoming fuel charge is concentrated at a portion C, and that such a concentration makes it impossible to obtain equal distribution of fuel to the cylinders.

Figure 4:
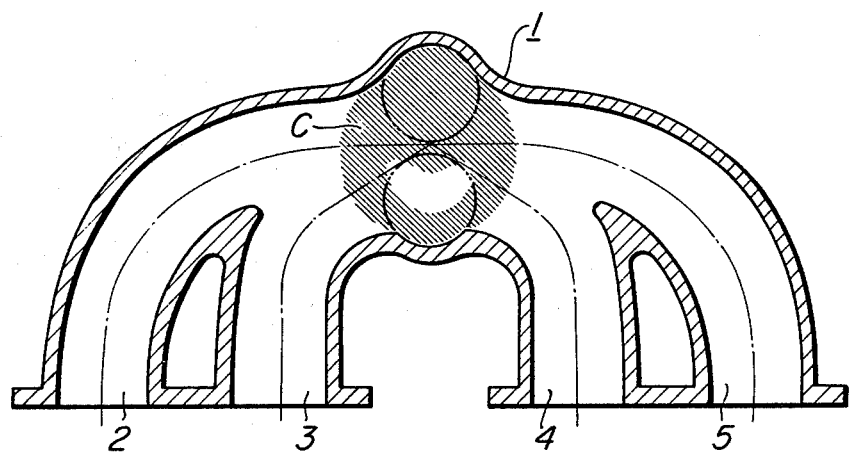

FIG. 4 shows the results of experiments similar to those shown in FIG. 3 but conducted by using an extension tube. It will be seen that the incoming fuel charge is distributed evenly and equal distribution thereof to the cylinders can be obtained. However, if the fuel charge is in particles of large size it would take time for such fuel to be sucked into the cylinders and complete combustion of such fuel could not be obtained even if sucked into the cylinders, so that smooth operation of the engine could not be assured. This problem might be solved by providing incoming fuel charge heating means in a portion of the intake manifold in which the fuel is introduced or even distribution of the fuel is obtained. However, with the fuel distribution as shown in FIG. 4, it would be imperative to increase the area of the heating surface.

Figure 5:
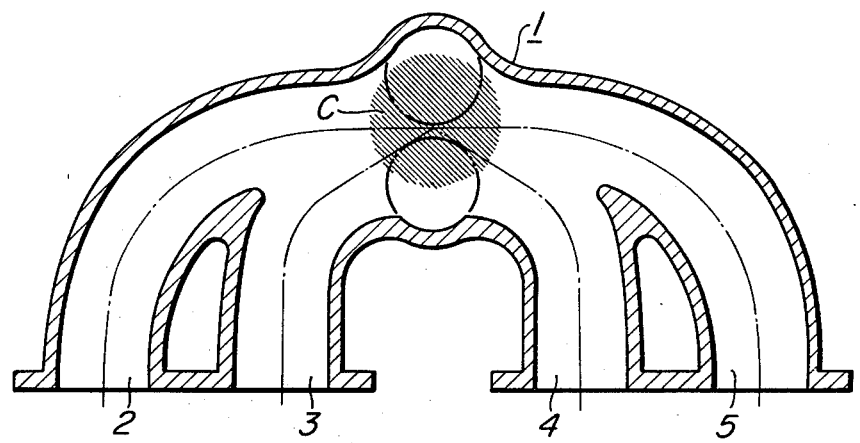

FIG. 5 shows the results of experiments similar to those shown in FIG. 3 but conducted by using an extension tube and raising the surface of the bottom of the intake manifold toward the open end of the extension tube. It will be seen that in the intake manifold of this construction the incoming fuel charge is evenly distributed and concentrated at the point at which the axial center lines of the branch intake conduits gather together. The results of the experiments indicate that equal distribution of the incoming fuel charge could be obtained by placing the heating surface in this position. It would not be necessary to raise the surface of the bottom of the intake manifold, and the heating surface has only to be disposed at a higher level remote from the surface of the bottom of the intake manifold.

Figure 6A:
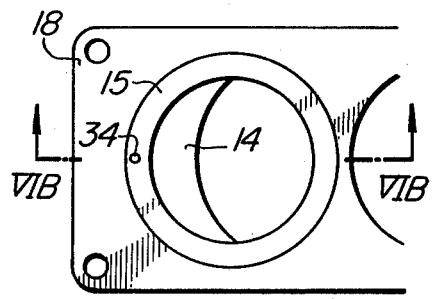
FIG. 6A is a top plan view of a second embodiment of the invention, showing the manner in which the extension tube is mounted.
Figure 6B:
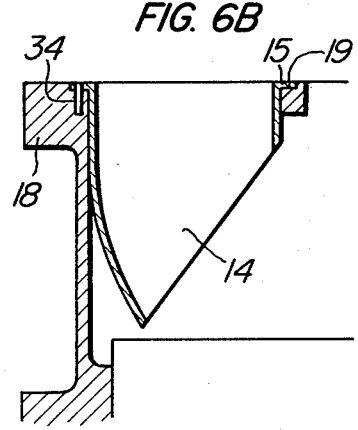
FIG. 6B is a sectional view taken along the line VIB—VIB in FIG. 6A.

FIGS. 6A and 6B show a second embodiment. FIG. 6A is a top plan view of the extension tube 14 having its flange 15 fitted in the recess 19 formed by spot facing, and FIG. 6B is a vertical sectional view taken along the line VIB—VIB in FIG. 6A. In this embodiment, a knock pin 34 is inserted in the flange 15 of the extension tube 14, to facilitate positioning of the extension tube 14 and prevent rotation thereof.

Figure 7A:
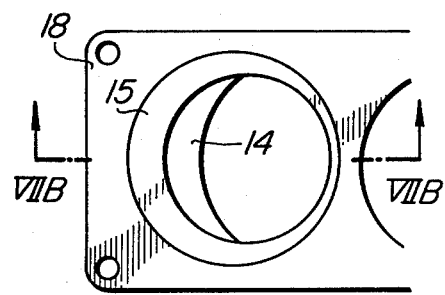
FIG. 7A is a top plan view of a third embodiment of the invention, showing the manner in which the extension tube is mounted.
Figure 7B:
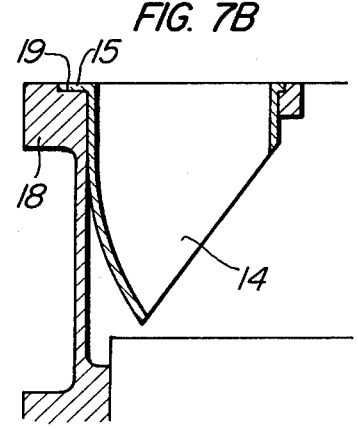
FIG. 7B is a sectional view taken along the line VIIB—VIIB in FIG. 7A.

FIGS. 7A and 7B show a third embodiment and correspond to FIGS. 6A and 6B respectively. In this embodiment, the recess 19 formed by spot facing in the flange 18 of the intake manifold 1 and the flange 15 of the extension tube 14 are eccentric with respect to the opening 10' of the intake manifold 1. The third embodiment can achieve the same effects as described by referring to the second embodiment.

The intake manifold according to the invention is characterized by, and can achieve results as follows:
1. The intake manifold has an extension tube mounted therein in a manner so as to communicate with the primary bore of the carburetor and to curve at its open end toward a part of the intake manifold at which axial center lines of branch intake conduits connected to the cylinders gather together, and an incoming fuel charge heating means mounted in the intake manifold and has a heating surface disposed near the open end of the extension tube. By these features, vaporization of the incoming fuel charge can be expedited and the vaporized fuel can be equally distributed to the cylinders.
2. The extension tube is curved smoothly in its wall and cut to form an open end disposed in a plane which is oblique with respect to the center axis of the extension tube, so that the open end forms an acute angle with the wall of the extension tube at the outermost edge of the open end as viewed in cross section. This increases the area of the open end of the extension tube and minimizes the resistance offered by the extension tube to the flow of incoming fuel charge.
3. The wall of the extension tube contiguous with the innermost edge of the open end of the tube as viewed in cross section is straight and not curved. This facilitates mounting of the extension tube in the intake manifold.
4. The outermost edge of the open end of the extension tube forming an acute angle with the wall of the tube as viewed in cross section is arranged near the incoming fuel charge heating surface of a ceramic heater having PTC thermistors. By this arrangement, atomized fuel concentratedly impinges against the incoming fuel charge heating surface of elevated temperature, so that immediate vaporization of the fuel and equal distribution thereof to the cylinders can be obtained. Transfer response can be improved also.
5. The heating surface of the incoming fuel charge heating means projects into the interior of the intake manifold. This allows the fuel to be concentrated and vaporized in a portion where air streams actively occur. This ensures that the fuel is equally distributed to the cylinders, and in the event of the fuel not being vaporized on the heating surface, the fuel can be vaporized while dropping from the heating surface onto the bottom of the intake manifold.

What is claimed is:
1. An intake manifold for a multicylinder internal combustion engine having fuel supplying means, comprising:
a plurality of branch intake conduits each communicating with one of a plurality of cylinders of the internal combustion engine;
an extension tube connected to a primary suction conduit of the fuel supplying means and extending within said intake manifold; and
incoming fuel charge heating means located in said intake manifold, wherein the improvement resides in:
said extension tube including a portion within the intake manifold which is smoothly curved downward inwardly towards a bottom surface of the manifold and towards a location within the intake manifold at which axial center lines of said branch intake conduits converge, said curved portion of the extension tube having an outermost wall terminating in an open end directed down toward and located adjacent to a heating surface of said incoming fuel charge heating means, said open end being disposed in a plane which forms on one side an acute angle with the outermost wall of said curved portion and which intersects an axis of a straight extending portion of the extension tube located above said curved portion, and on an opposite side of said open end extending contiguously with an innermost wall of said straight extending portion located adjacent an entrance of said intake manifold.
2. An intake manifold as claimed in claim 1, wherein said heating surface of said incoming fuel charge heating means projects from the bottom surface of the intake manifold and is disposed parallel thereto.

* * * * *